(12) United States Patent
Joo et al.

(10) Patent No.: US 9,233,311 B2
(45) Date of Patent: *Jan. 12, 2016

(54) METHOD, SYSTEM AND COMPUTER READABLE RECORDING MEDIUM FOR PROVIDING RANKING OF GAME GROUP

(71) Applicant: NHN Entertainment Corporation, Seongnam-si (KR)

(72) Inventors: Seong Youn Joo, Seongnam-si (KR); Kyung E Moon, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,348

(22) Filed: Nov. 7, 2014

(65) Prior Publication Data

US 2015/0065247 A1    Mar. 5, 2015

Related U.S. Application Data

(63) Continuation of application No. 14/167,872, filed on Jan. 29, 2014, now Pat. No. 9,149,726, which is a continuation of application No. 13/526,465, filed on Jun. 18, 2012, now Pat. No. 8,696,467.

(30) Foreign Application Priority Data

Jun. 17, 2011   (KR) .................. 10-2011-0058975

(51) Int. Cl.
   *A63F 13/10*    (2006.01)
   *A63F 13/798*   (2014.01)
   *A63F 13/30*    (2014.01)

(52) U.S. Cl.
   CPC .............. *A63F 13/798* (2014.09); *A63F 13/12* (2013.01); *A63F 2300/556* (2013.01); *A63F 2300/558* (2013.01); *A63F 2300/61* (2013.01)

(58) Field of Classification Search
   USPC .......................... 463/16–25, 40–43; 273/292
   See application file for complete search history.

(56) References Cited

U.S. PATENT DOCUMENTS 7,819,749 B1 * 10/2010 Fish et al. ........................ 463/42
7,828,661 B1 * 11/2010 Fish et al. ........................ 463/42

(Continued)

FOREIGN PATENT DOCUMENTS

JP   2002-140524   5/2002
JP   2002-331171   11/2002

(Continued)

OTHER PUBLICATIONS

Jang, Jeseok, "NC Strengthens Casual Line-up with 'Pop Cap World' Order Sheet", Gamemeca, http://www.gamemeca.com/news/view.php?gid=88491, Sep. 14, 2010.

(Continued)

*Primary Examiner* — Masud Ahmed
(74) *Attorney, Agent, or Firm* — H.C. Park & Associates, PLC

(57) ABSTRACT

A ranking method and system for providing a ranking of a game group is disclosed. The method includes creating a game group including a user and at least one member among the user's registered friends who have joined a game service, based on a game group creation request received from a user terminal. The method further comprises calculating a ranking of the user with respect to other members of the created game group based on a ranking inquiry request received from the user terminal, and providing the user terminal with the calculated ranking of the user. The user terminal drives a game service platform associated with a plurality of games and provides the game group creation request information and the ranking inquiry request information through the game service platform.

27 Claims, 11 Drawing Sheets

(56) References Cited

U.S. PATENT DOCUMENTS

| | | | |
|---|---|---|---|
| 8,696,467 B2 | 4/2014 | Joo et al. | |
| 2004/0192440 A1 | 9/2004 | Evans et al. | |
| 2004/0224772 A1 | 11/2004 | Canessa et al. | |
| 2006/0247055 A1 | 11/2006 | O'Kelley et al. | |
| 2006/0258463 A1* | 11/2006 | Cugno et al. | 463/42 |
| 2006/0287106 A1 | 12/2006 | Jensen | |
| 2007/0173325 A1 | 7/2007 | Shaw et al. | |
| 2007/0191101 A1* | 8/2007 | Coliz et al. | 463/42 |
| 2007/0191102 A1* | 8/2007 | Coliz et al. | 463/42 |
| 2009/0075738 A1 | 3/2009 | Pearce | |
| 2009/0111576 A1 | 4/2009 | Ostergren et al. | |
| 2009/0271714 A1 | 10/2009 | Cox et al. | |
| 2010/0035689 A1* | 2/2010 | Altshuler et al. | 463/39 |
| 2011/0250971 A1 | 10/2011 | Van Os et al. | |

FOREIGN PATENT DOCUMENTS

| | | |
|---|---|---|
| JP | 2003-038855 | 2/2003 |
| JP | 2006-158956 | 6/2006 |
| JP | 2007-206823 | 8/2007 |
| JP | 2008-018189 | 1/2008 |
| JP | 2008-538318 | 10/2008 |
| JP | 2009-183567 | 8/2009 |
| JP | 2011-500277 | 1/2011 |
| JP | 2011-101775 | 5/2011 |
| KR | 10-2002-0089856 | 11/2002 |
| KR | 10-2006-0031836 | 4/2006 |
| KR | 10-2006-0042469 | 5/2006 |
| KR | 10-2006-0112723 | 11/2006 |

OTHER PUBLICATIONS

Jung, Yu Hee, "'Mat-Go' to a Social Age? Go-stop Enters Facebook", Zdnet, http://www.zdnet.co.kr/news/news_view.asp?article_id=20110128152735&type=det, Jan. 28, 2011.

Park, Gye Hyun, "Social Games, The Influence doubles when they unite", Inews, http://news.inews24.com/php/news_view.php?g_serial=570872&g_menu=020500&rrf=nv, May 4, 2011.

Non-Final Office Action issued on Aug. 2, 2013 in U.S. Appl. No. 13/526,465.

Notice of Allowance issued on Jan. 6, 2014 in U.S. Appl. No. 13/526,465.

Notice of Allowance issued on Jul. 24, 2015, in U.S. Appl. No. 14/167,872.

Final Office Action issued on Apr. 29, 2015, in U.S. Appl. No. 14/167,872.

Non-Final Office Action mailed on Jun. 19, 2015, in U.S. Appl. No. 14/536,202.

Ea Korea, "<Battlefield 3><FIFA 12>, etc., the platforms which delivers the best game contents directly to the consumers," URL: http://www.thisisgame.com/board/view.php?id=674632&category=101, published: Jun. 8, 2011, retrieved: Dec. 16, 2012.

Mixi, Nikkei Personal Computing, pp. 48, 49, and 113, http://pc.nikkeibp.co.jp/, Jan. 24, 2011.

Social game based on Facebook, Nov. 30, 2010.

How to use Facebook, Find Friend, Manage Friend (Make Friend List), HolySky.com, Dec. 1, 2010.

Korean Office Action issued Feb. 13, 2014, in Korean Application No. 10-2013-0116525.

Non-Final Office Action mailed on Jun. 10, 2015, in U.S. Appl. No. 14/536,229.

Non-Final Office Action mailed on Feb. 11, 2015, in U.S. Appl. No. 13/495,422.

Final Office Action mailed on Jun. 12, 2015, in U.S. Appl. No. 13/495,422.

Non-Final Office Action mailed on Jun. 23, 2015, in U.S. Appl. No. 14/536,260.

Non-Final Office Action mailed on Jan. 5, 2015, in U.S. Appl. No. 14/167,872.

Final Office Action issued on Sep. 22, 2015, in U.S. Appl. No. 14/536,229.

* cited by examiner

Fig. 9

| | | 900 | |
|---|---|---|---|
| 910 | User ID | Sims04 | |
| 920 | Nickname | Child of Rambo | |
| 930 | Groups (tags) that I created | 1 | Orange County working mom |
| | | 2 | Stunning Beauty K |
| | | ⋮ | |
| 940 | Joined groups (tags) | 1 | Drama Buff |
| | | 2 | NHN |
| | | ⋮ | |
| 950 | Registered friends | Brown Bear | |
| | | Blackie | |
| | | Eagle SAM | |
| | | ⋮ | |
| 960 | Joined SNS | Facebook | |
| | | ⋮ | |
| 970 | My score | 14580000 point | |

METHOD, SYSTEM AND COMPUTER READABLE RECORDING MEDIUM FOR PROVIDING RANKING OF GAME GROUP

CROSS REFERENCE TO RELATED APPLICATIONS

This application is a continuation of U.S. patent application Ser. No. 14/167,872, filed on Jan. 29, 2014, which is a continuation of U.S. patent application Ser. No. 13/526,465, filed on Jun. 18, 2012, and now issued as U.S. Pat. No. 8,696,467 and claims priority from and the benefit of Korean Patent Application No. 10-2011-0058975, filed on Jun. 17, 2011, each of which is hereby incorporated by reference for all purposes as if fully set forth herein.

BACKGROUND OF THE INVENTION

1. Field of the Invention

Exemplary embodiments of the present invention relate to a method, a system, and a computer-readable recording medium for providing a ranking of a game group, in which the group is created among users who have joined a game service as a member on a client terminal device, and the ranking is provided for the created group.

2. Discussion of the Background

As the performance of recently released smart phones is enhanced, users may move from general cellular phones to smart phones. A smart phone is an intelligent cellular phone having computer support functions such as, personal digital assistant (PDA) functions, Internet functions, and moving image playback functions, while still providing original functions of the cellular phone. The smart phone may have a variety of input methods and a touch screen to provide a convenient interface for use. In addition, the smart phone may be connected to the Internet and other computers with the support of wireless Internet functions so as to perform functions, such as e-mail, web browsing, facsimile, banking, and/or playing a game. The smart phone is equipped with a standardized operating system (OS) or a dedicated operating system to perform a variety of functions.

Since a variety of functions can be implemented through various client terminal devices such as the smart phone, a variety of dedicated application programs and contents operating within the client terminal device have been developed. In addition, as the functions for client terminal devices are improved, a large number of mobile games that users can enjoy in an environment similar to the web have been developed. Numerous network games have been developed to allow users who have connected to a network through client terminal devices to play the same game while being connected with the network. When a user is playing a game, a game client is generally mounted on the client terminal device and connected to a game server through a wired or wireless communication network, so as to execute the game on the client terminal device.

Most games record game points of each user and show a ranking of the game points. However, since a conventional ranking service provided for a game shows a general ranking of the game users, the general rankings generally do not provide information that motivates the game users, and the rankings are not shown in a variety of ways. Accordingly, there is a limitation in providing meaningful information.

The above information disclosed in this background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a method and a system for providing a ranking of a game group, in which the group is created in a game service provided through a client terminal device, and a variety of meaningful game ranking information is provided by comparing rankings within the group created by a client and comparing rankings among the groups.

Additional features of the invention will be set forth in the description which follows, and in part will be apparent from the description, or may be learned by practice of the invention.

Exemplary embodiments of the present invention provide a method performed by a game service platform server including a group ranking management module to provide a ranking of a game group. The method includes creating, in response to a game group creation request received from a client terminal of a client, the game group including the client and at least one member among registered friends of the client. The registered friends have joined a game service. The method further includes calculating a ranking of the client with respect to other members of the created game group in response to a ranking inquiry request received from the client terminal, and providing the client terminal with the calculated ranking of the client. The client terminal drives the game service platform associated with a plurality of games and provides the game group creation request and the ranking inquiry request through the game service platform.

Exemplary embodiments of the present invention also disclose a method performed by a game service platform server including a group ranking management module to provide a ranking of a game group. The method includes creating, in response to a game group creation request received from a client terminal of a client, a game group including a client and at least one member among members having joined a game service, calculating a ranking of the client with respect to other members of the created game group in response to a ranking inquiry request received from the client terminal. The method further includes providing the client terminal with the calculated ranking of the client. The client terminal drives a game service platform associated with a plurality of games and provides the game group creation request and the ranking inquiry request through the game service platform, and the game group creation request information further includes at least one piece of tag information mapped to the created game group.

Exemplary embodiments of the present invention, also disclose a system to provide a ranking of a game group. The system includes a client terminal of a client and a game service platform server. The client terminal drives a game service platform associated with a plurality of games and provides a game group creation request and a ranking inquiry request through the game service platform. The game service platform server includes a group ranking management module to create, in response to the game group creation request received from the client terminal, the game group including the client and at least one member among registered friends of the client having joined a game service. The group ranking management module is configured to calculate a ranking of the client with respect to other members of the created game group in response to the ranking inquiry request received from the client terminal, and to provide the client terminal with the calculated ranking of the client.

Exemplary embodiments of the present invention disclose a system to provide a ranking of a game group. The system includes a client terminal of a client and a game service platform server. The client terminal drives a game service platform associated with a plurality of games and provides a game group creation request and a ranking inquiry request through the game service platform. The game service platform server includes a group ranking management module to create, in response to the game group creation request received from the client terminal, the game group including a client and at least one member among members having joined a game service. The group ranking management module is configured to calculate a ranking of the client with respect to other members of the created game group in response to the ranking inquiry request received from the client terminal, and to provide the client terminal with the calculated ranking of the client. The game group creation request includes at least one piece of tag information mapped to the created game group.

Exemplary embodiments of the present invention also provide a non-transitory computer-readable medium including an executable program which, when executed, performs a method of providing a ranking of a game group. The method includes creating, in response to a game group creation request received from a client terminal of a client, a game group comprising the client and at least one member among registered friends of the client having joined a game service. The method further includes calculating a ranking of the client with respect to other members of the created game group in response to a ranking inquiry request received from the client terminal, and providing the client terminal with the calculated ranking of the client. The client terminal drives a game service platform associated with a plurality of games and provides the game group creation request and the ranking inquiry request through the game service platform.

Exemplary embodiments of the present invention, also disclose a method performed by a game service platform server including a group ranking management module to provide a ranking of a game group. The method includes creating, in response to a game group creation request received from a client terminal of a client, a game group including the client and a member of at least one game service among a plurality of game services associated with the game service platform, and receiving a request for executing a game service associated with the game service platform from the client terminal. The method further comprises calculating, in response to receiving the request for execution from the client terminal, user ranking information for the member having installed the game service, and providing the client terminal with the calculated ranking information of the client. The game service platform is accessible through the game service associated with the game service platform server.

Exemplary embodiments of the present invention, disclose a method performed by a game service platform server including a group ranking management module to provide a ranking of a game group. The method includes creating, in response to a game group creation request received from a client terminal of a client, a game group including the client and a member of at least one game service among a plurality of game services associated with the game service platform. The method further comprises calculating a ranking of the client with respect to other members of the created game group in response to a ranking inquiry request received from the client terminal, and providing the client terminal with the calculated ranking information of the client. The calculating the ranking of the client comprises calculating the ranking of the client based on a game score integrated from a plurality of games associated with the game service platform.

Exemplary embodiments of the present invention, also disclose a method performed by a game service platform server including a group ranking management module to provide a ranking of a game group. The method includes creating, in response to a game group creation request received from a client terminal of a client, a game group including the client and members of at least one game service among a plurality of game services associated with the game service platform, and determining whether the plurality of game services associated with the game service platform is installed in terminals of the members of the created game group in response to a game group inquiry request received from the client terminal. The method further includes transmitting a result of the determination to the client terminal, calculating ranking information of the client with respect to members having installed a game service selected by the client among the members of the created game group, if the client selects one of the game services displayed on the client terminal, and providing the client terminal with the calculated ranking information of the client. The game service platform is accessible through the game service associated with the game service platform server.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9 is a view showing an information storage table for providing a group ranking for each user according to exemplary embodiments of the present invention.

DETAILED DESCRIPTION OF THE ILLUSTRATED EMBODIMENTS

Figure 1:
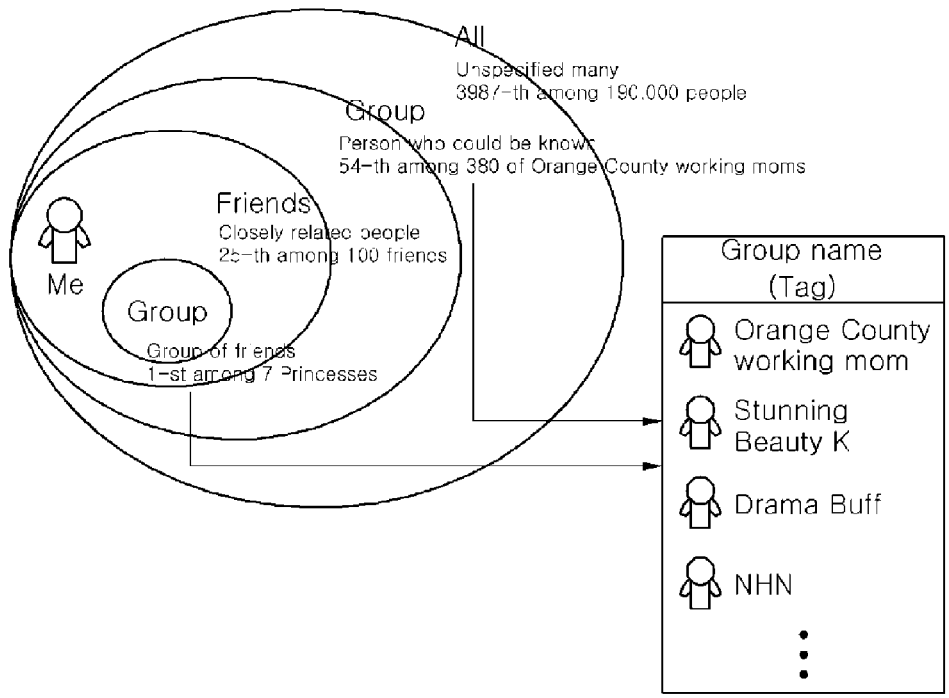
FIG. 1 is a view showing the concept of creating a group according to exemplary embodiments the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A user may create a group by setting a specific tag (or keyword), and each user may search for a group among created groups and join the searched group.

When a group is created, qualifications for joining the corresponding group can be set, and when a user joins the group, approval of joining the group can be determined by automatically examining the joining qualifications, or can be determined with the approval of a group creator or a service server.

The group can be created as a small group within the user's game friends registered by the user or can be created using a specific tag, targeting all the users joining a game service as members.

Exemplary embodiments of the invention can be applied to a 'smart phone'. In general, exemplary embodiments of the invention can be applied to any client terminal device capable of executing an application, including, but not limited to, a mobile or cellular terminals, a laptop computer, a digital broadcasting terminal, a personal digital assistant (PDA), a portable multimedia player (PMP), a navigation device, as well as fixed terminals such as a computer and a TV.

'Game service platform' may refer to a software framework (including an application program framework) which provides integrated management of information and services related to each game in association with at least a game program (preferably, a plurality of game programs). For example, the game service platform may be a basis for executing individual game software, and the execution of a program may not be restricted to a specific operating system through the game service platform.

'Acquaintance' may refer to a person with whom a client terminal device user executing the game service platform establishes a relation through a certain channel (for example, stores the person in the address book of the client terminal device, or registers the person in a social network service (SNS) as a friend), and the connection relation is stored in computer-readable memory. 'Non-acquaintance' may refer to the opposite of 'acquaintance'. For example, a "non-acquaintance" may be a person with whom a relation with the client terminal device user (e.g., user) executing the game service platform has not been established through any channel, and/or the connection relation has not been stored in the computer-readable memory. The acquaintance and the non-acquaintance may be distinguished and separately registered as game friends through different methods.

In addition, the game service platform may be integrated in a smart phone, may manage a plurality of game software in an integrated manner, and may provide a variety of services in association with each game software. For example, the game service platform may provide an interface allowing each user to access each game, as well as a variety of records and statistical data related to the game. The game service platform may also provide a function for creating a group and provide information on rankings in each group and rankings among groups, calculated for the created groups through the smart phone.

'Ranking' may refer to a ranking for points or scores obtained in a game, and, in some cases, may be a ranking for points assigned to each round of a specific game or a ranking for total points integrated by the game service platform.

Hereinafter, exemplary embodiments of the invention will be described in detail with reference to the accompanying drawings so that those skilled in the art may easily understand the invention.

A game service platform manages information on each game in association with a plurality of games, provides a function for creating a group, and calculates and provides a ranking of each group. A method for providing a ranking may be implemented within each game program without separately installing the game service platform in a smart phone, and the method may be implemented on the game service platform to create a group, provide a ranking of the created group, and provide an integrated ranking of the plurality of games.

Creating a Group

FIG. 1 is a view showing how a user may create a group according to exemplary embodiments of the present invention. Referring to FIG. 1, a game service user may register game friends by a variety of methods in relation to a game service. The registration methods include, but are not limited to, automatically adding a friend from the user's address book, automatically adding a social network service (SNS) friend, searching for and adding a person who registered the game service user as a friend, searching for and adding a friend using an identity (ID)/nickname, or adding a person from a list provided through a user information window or recommendation of non-acquaintances. The user may create a group within the registered game friends (e.g., acquaintances) or among all game service users (e.g., all the users without distinguishing acquaintances and non-acquaintances).

When a group is created with respect to all the game service users, tags (e.g., Orange County working mom, Stunning Beauty K, Drama Buff, or NHN) are designated to the group, and the group may be created according to each of the tags. If the group is created in this way, some of all the service users may join the group, thereby creating the group.

If a specific group is created within game friends or among all the game service users, a ranking of a user within the group or a ranking among the groups is calculated, and information on the calculated ranking may be provided to each service user within each game program, or preferably through the game service platform which will be described later.

Game Service Platform

Figure 2:
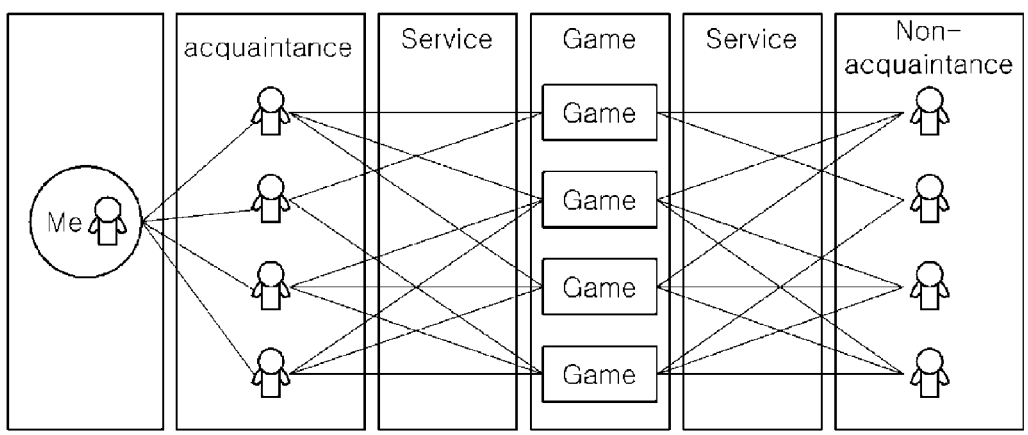
FIG. 2 is a view showing the concept of a game service platform according to exemplary embodiments of the present invention.

FIG. 2 is a view showing a game service platform according to exemplary embodiments of the present invention. Referring to FIG. 2, the game service platform supporting the ranking providing system may allow a user to easily create a group by registering a game friend or tag, and may provide a basis for easily joining a group and providing a ranking of each group.

For example, a user may register his or her acquaintances as game friends and may create a small group within the corresponding game friends, or may create a group by setting a tag and form a group with respect to all game service members (non-acquaintances). In addition, a ranking within a social network service (SNS) group which the user has joined or a ranking among the groups may be provided.

In addition, effective ranking information may be provided through the interconnection between an individual game and the game service platform. For example, structural flexibility may be secured by providing ranking information of an individual game within the game and/or switching the ranking information to a screen of the game service platform using a ranking interface customized within the game.

Accordingly, meaningful rankings within a created game group may be provided by providing the ranking information through the game service platform. A sense of belonging and solidarity of a community may be obtained by comparing the rankings among the groups.

Hereinafter, a system and detailed components thereof according to exemplary embodiments of the present invention will be described with reference to FIGS. 3 and 4, and procedures of recommending a friend and executing a game according to exemplary embodiments of the present invention will be described in detail with reference to FIGS. 5, 6, 7, and 8.

Overall System Configuration

Figure 3:
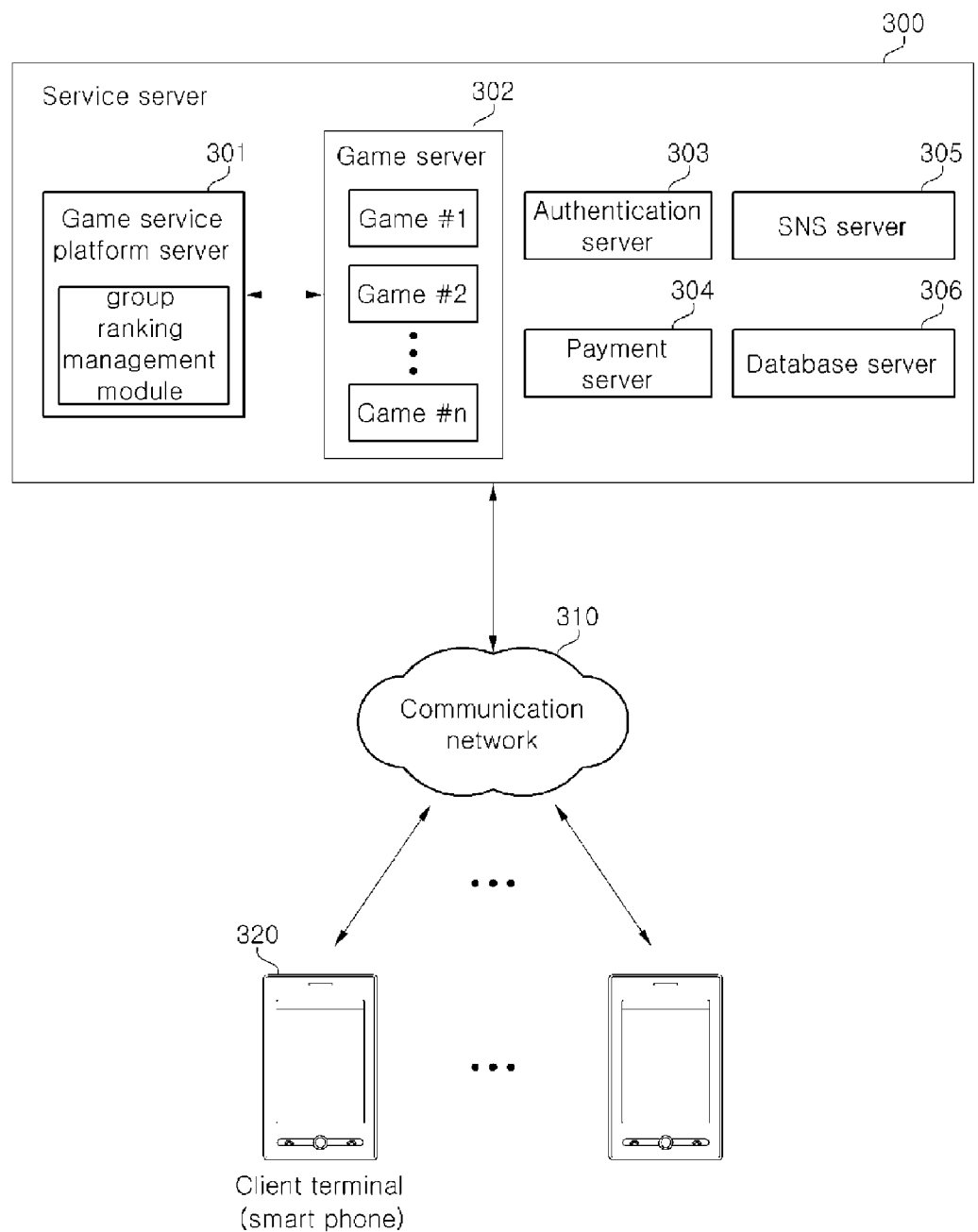
FIG. 3 is a view showing a system for providing ranking information through a game service platform according to exemplary embodiments of the present invention.

FIG. 3 is a view showing a system for providing ranking information through a game service platform according to exemplary embodiments of the present invention.

Referring to FIG. 3, a service server 300 of a service provider may be connected to a plurality of client terminals (e.g., smart phones) 320 in which a game service platform is executed through a communication network 310. The service server 300 may include a game service platform server 301, a game server 302, an authentication server 303, a payment server 304, a SNS server 305, and a database server 306. The game server 302 may separately perform a function for individual games so that a plurality of games may be driven through each of the client terminals 320.

The communication network 310 can be configured through a wired or wireless communication and/or through short range communications (e.g., Infrared Data Association (IrDA), Bluetooth), and can be configured through a variety of communication networks such as a personal area network (PAN), a local area network (LAN), a metropolitan area network (MAN), and a wide area network (WAN). In some cases, the communication network may be the world wide web (WWW).

The game service platform server 301 may be associated with the game server 302 and may provide each of the client terminals 320 with the game service platform. The game service platform server 301 may create a group and provide important functions for providing a ranking within the created group or a ranking among the groups. Detailed functions of the game service platform server 301 will be described below with reference to FIG. 4.

The game server 302 may provide the client terminals 320 with programs or information related to each game in order to provide a user with a variety of games. The user may download a game application from the game server 302, and install and execute the game application in the client terminal 320. For example, the game server 302 may install the game application if the game application is not installed in the client terminal 320 and may update the game application to a newer version if the game application on the client terminal 320 is an old version. In some cases, a game application may be downloaded from a dedicated download server (not shown) or the game service platform server 301, and not from the game server 302.

The game server 302 may share ranking information with the game service platform server 301, provide ranking information of each game, and be associated with the game service platform server 301 through a ranking interface customized for each game.

The authentication server 303 may perform authentication for each client terminal 320 on connection to the game service platform server 301 and/or on execution of a game on each client terminal 320. The game service platform server 301 or the game server 302 may provide the client terminal 320 with a variety of corresponding services depending on a result of the authentication.

The game server 302 may calculate a user's elapsed time and a time limit of a game and provide the client terminal 320 with a result thereof through communications with the client terminal 320. The game server 302 may implement a free trial allowing the user to enjoy a game for free for a certain period of time set by the game producers or by default by the game server 302 or may implement a function allowing the user to play the game only at a predetermined time on a time basis rate also set by the game producers or by default by the game server 302. If a specific game is a pay game for which a user is charged, the game may be provided after a payment is made through the payment server 304. In addition, the authentication server 303 may continuously communicate with servers 301 and/or 302 while the game is in progress to maintain the game, and thus the game server 302 may determine whether or not the network connection is maintained through communications with the client terminal 320.

The SNS server 305 may provide social network services (SNS) (e.g., Facebook® service) of a service provider, and may provide ranking information within a SNS group through the game service platform server 301 by providing the game service platform server 301 with information on members.

In some cases, the SNS server 305 may be operated by the same company of the game service platform server 301, and, in some cases, SNS servers may be operated by other companies outside the service server 300.

The database server 306 may store a variety of information needed for providing the client terminal 320 with a game service platform and a plurality of games, and may provide information requested from the game service platform server 301, the game server 302, the authentication server 303, the payment server 304, and/or the SNS server 305. The requested information may include information related to execution of the game service platform, information related to execution of a game application, authentication information including user information, information on records related to a game, and/or ranking information.

The information related to the execution of a game application may include information needed for executing the game application, such as whether or not the game application is downloaded to the client terminal 320, a version of the game, and an Internet protocol address of the game server 302. The authentication information containing user information may include user unique information for determining whether or not a valid user is executing the game, terminal unique information for determining whether or not the game is executed at an authenticated client terminal 320. The information on the game may include information such as identification, a nickname, an avatar, an age, a sex, a grade, a game result, a ranking, and/or a score of the user; information on whether or not the user has passed a specific stage; information on whether or not the user has accomplished a specific mission; information on whether or not the game is a free trail game; and/or information on a time limit of the game.

Figure 4:
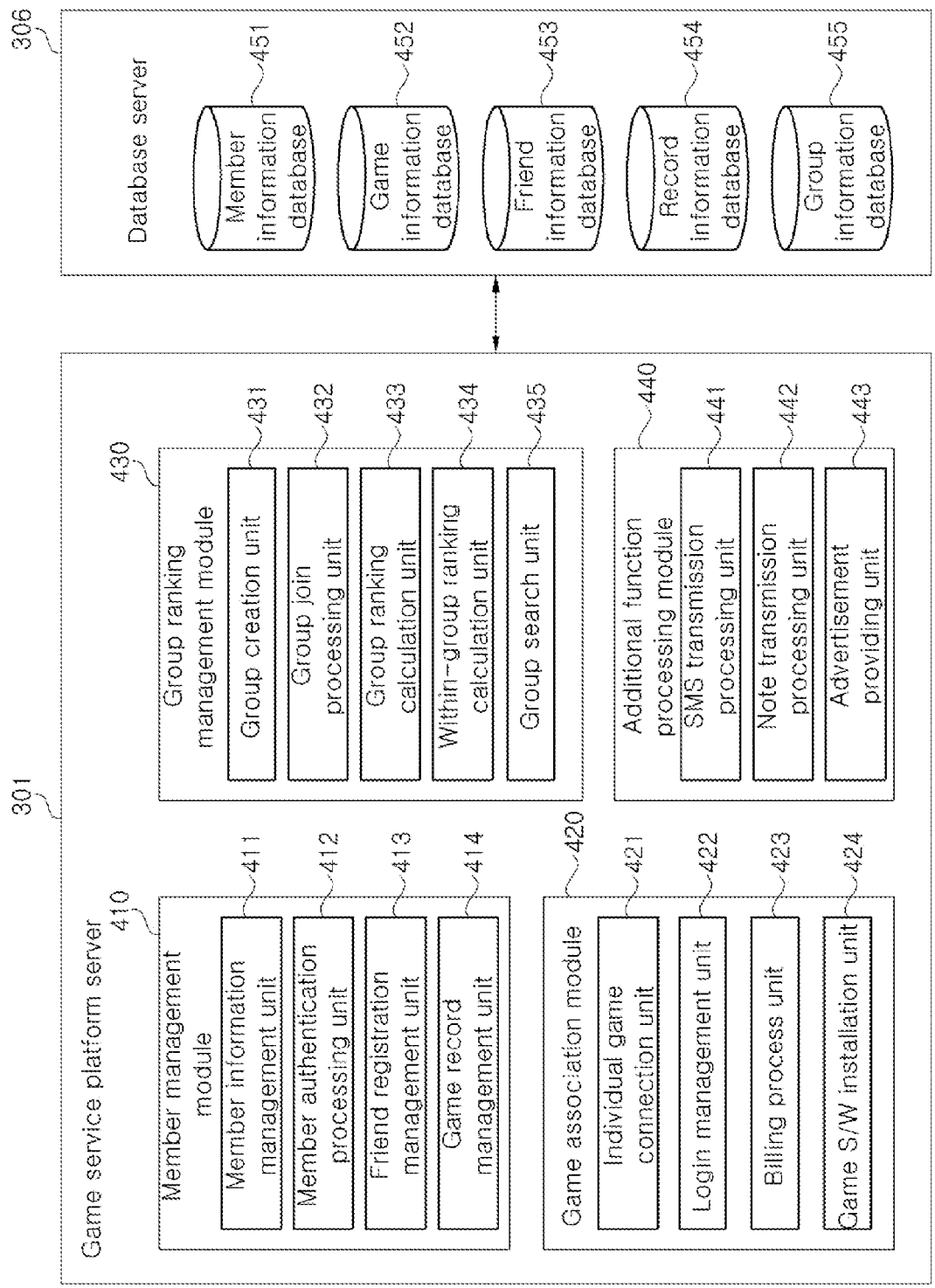
FIG. 4 is a view showing a structure of a game service platform server and a database server according to exemplary embodiments of the present invention.

The database server 306 may include a plurality of databases as shown in FIG. 4, and a database containing a portion or all of the databases' information may be stored in the client terminal 320.

In addition, a group ranking management module for managing a mission or a score accomplished by the user in a game may be included in the game service platform server 301 or the game server 302. The database server 306 may further include information related to the group ranking management module. Although FIG. 3 illustrates the service server 300 including six servers 301, 302, 303, 304, 305, and 306, the six servers may be functionally integrated or separated. In addition, some servers having additional functions may be further included as described above, and thus the service server 300 may include one or more servers, rather than six servers.

The client terminal 320 may include an input-output function for communicating with the service server 300 through the communication network 310 so that a user may execute a game service platform or a variety of games. The client terminal 320 may be any kind of digital device provided with a memory means and connected to a processor to have a processing capability. The client terminal 320 may be a desktop computer, a notebook computer, a workstation, a palmtop computer, a personal digital assistant (PDA), a web pad, or a mobile communication terminal such as a smart phone.

Game Service Platform Server Including a Group Ranking Management Module

FIG. 4 is a view showing a structure of the game service platform server 301 and the database server 306 according to exemplary embodiments of the present invention.

The game service platform server 301 may include a member management module 410, a game association module 420, a group ranking management module 430, and an additional function processing module 440 as shown in FIG. 4. The database server 306 for storing and transmitting a variety of data in association with the game service platform server 301 may include a member information database 451, a game information database 452, a friend information database 453, a record information database 454, and a group information database 455.

The member management module 410 manages a variety of personal information registered when a user joins a game service platform or an individual game as a member, and manages game records and information on friends registered by each member. The game association module 420 allows the game service platform server 301 to operate in association with individual games of the game server 302, and may allow the game service platform to process login and billing of the individual games. The group ranking management module 430 performs a function of creating a group or processing a request to join the created group and may provide a function of calculating a ranking within each created group and a ranking among the groups. The additional function processing module 440 can provide a variety of functions that can be additionally provided in relation to a game service.

All or some of detailed function units included in each module 410, 420, 430, and 440 of the game service platform server 301 may also be included in a service platform client application installed in the client terminal 320, and some of the detailed function units may be processed in an associated or distributed manner according to a server and client system.

Hereinafter, detailed functions of each of the modules will be described in detail.

The member management module 410 may include a member information management unit 411, a member authentication processing unit 412, a friend registration management unit 413, and a game record management unit 414. The member information management unit 411 may store a variety of information related to a member when a user accesses the game service platform server 301 and joins a service through the game service platform server 301 or updates a variety of information related to the member modified through an information home of the game service platform within the member information database 451.

The member authentication processing unit 412 performs authentication in association with the authentication server 303 when a user who has joined as a member logs in the game service platform or a game. The friend registration management unit 413 performs a function of managing game friends of a registered member. The game record management unit 414 performs a function of managing records of each game, records of all games, and ranking information of a member.

The game association module 420 may include an individual game connection unit 421, a login management unit 422, a billing process unit 423, and a game software (S/W) installation unit 424. The individual game connection unit 421 performs an interface function for connecting a user to a specific game when the game is selected among a plurality of games provided in the game server 302. The login management unit 422 performs a function of processing log in into a game in an integrated manner or individually processing log in into each game when a user accesses the game through the game service platform. The billing process unit 423 performs a function of processing billing in association with the payment server 304 when a connected game is a pay game. The game S/W installation unit 424 performs a function of automatically proceeding to a game S/W installation step and installing a game S/W when a user desires to access a specific game through the game service platform and S/W corresponding to the game is not installed in the client terminal 320.

Figure 6:
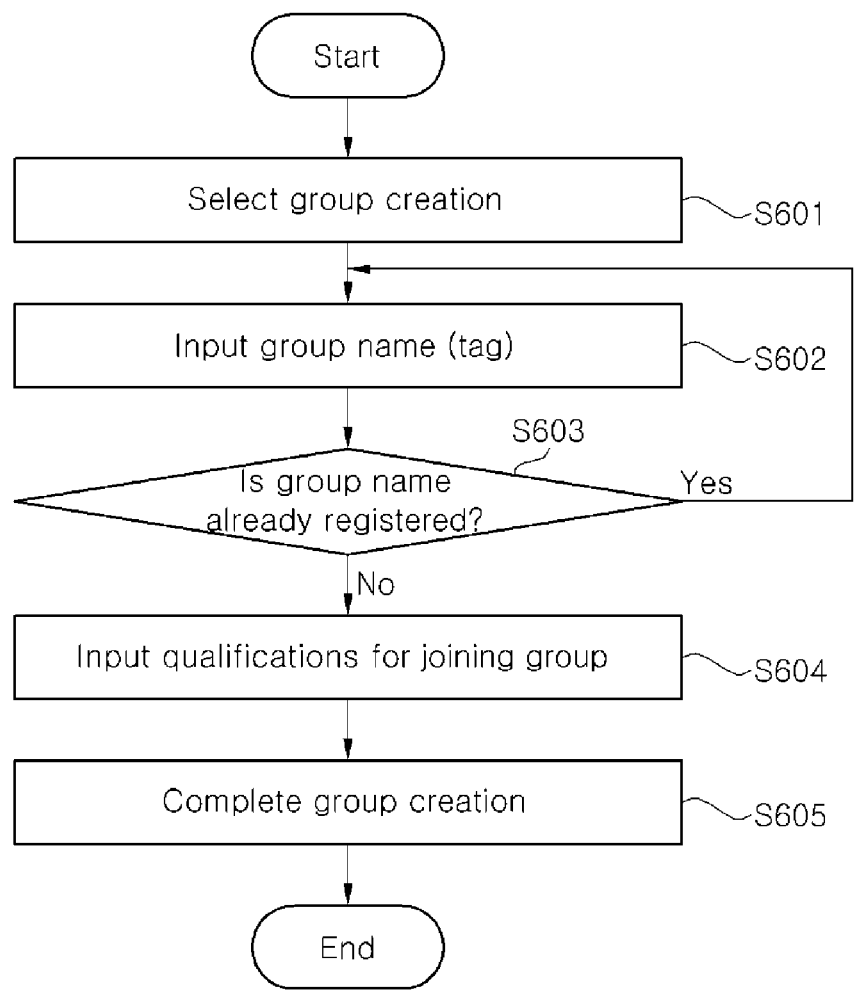
FIG. 6 is a flowchart illustrating a method of creating a group according to exemplary embodiments of the present invention.
Figure 7:
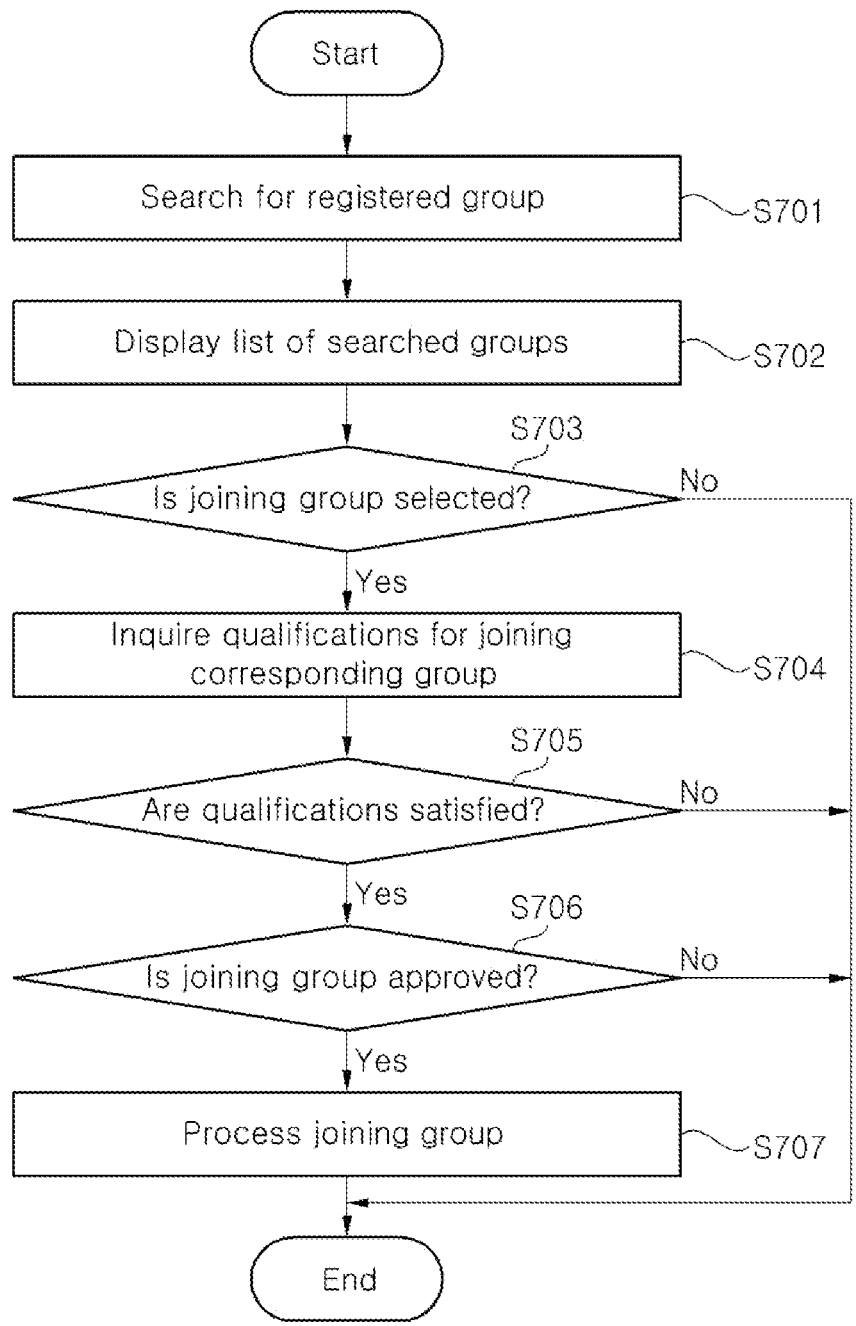
FIG. 7 is a flowchart illustrating a method of joining a group according to exemplary embodiments of the present invention.
Figure 8:
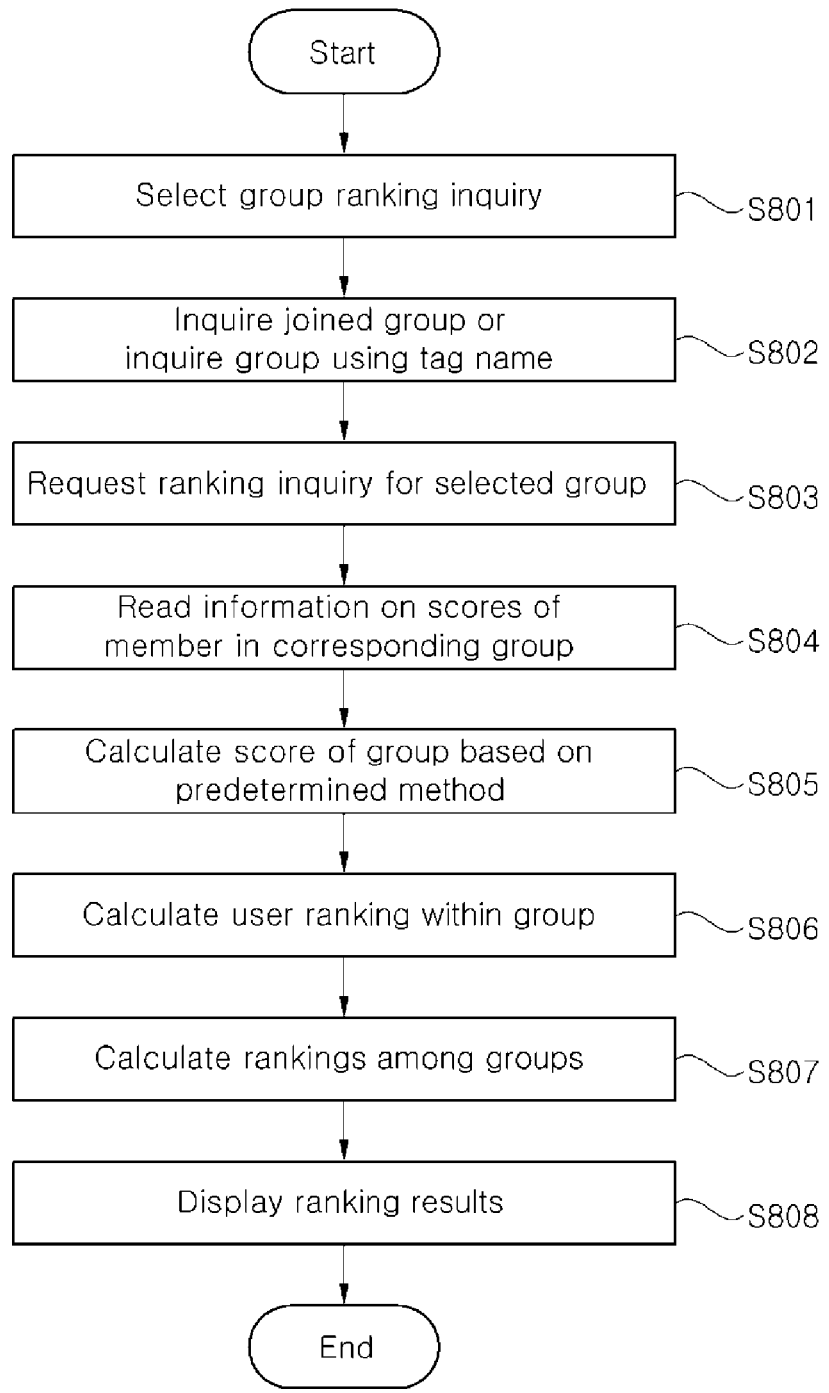
FIG. 8 is a flowchart illustrating a method of inquiring a group ranking according to exemplary embodiments of the present invention.

The group ranking management module 430 may include a group creation unit 431, a group join processing unit 432, a group ranking calculation unit 433, a within-group ranking calculation unit 434, and a group search unit 435. As shown in FIG. 6, which will be described below, the group creation unit 431 may create a new group by adding some or all of the game friends registered by a user through the game service platform, may create a new group by adding some or all of the game service members registered as a friend in an SNS service the user has joined, or may create a new group using a tag (or a keyword). The group can be created with respect to all the game service members, or specific qualifications for joining the group may be separately added when the group is created. The group join processing unit 432 performs a joining process for each group created by the group creation unit 431 as shown in FIG. 7, which will be described below. The group ranking calculation unit 433 and the within-group ranking calculation unit 434 perform a function of calculating a ranking of a corresponding group among all groups (as shown in FIG. 8 which will be described below) and a ranking of each member within a created group, respectively. The group search unit 435 performs a function of inputting a tag (or a keyword) through the game service platform and searching for a group stored in the group information database 455.

Each function unit of the group ranking management module 430 may facilitate creation of a group and addition of members to a group, and may calculate and provide a variety of ranking information related to each created group.

The additional function processing module 440 may include a short message service (SMS) transmission processing unit 441, a note transmission processing unit 442, and an advertisement providing unit 443. The SMS transmission processing unit 441 and the note transmission processing unit 442 provide a function of transmitting a SMS message or a note to a registered friend or a user in a joined group. The advertisement providing unit 443 performs a function of providing information or advertisements related to a variety of games associated with the game service platform.

In some cases, a variety of functions included in the game service platform server 301 may operate in association with a game service platform client application installed in the client terminal 320 to drive the game service platform. For example, some of the functions can be included in the game service platform client application of the client terminal 320, and the client terminal 320 may autonomously drive and provide corresponding functions without requiring a server. In some cases, the client terminal 320 may be provided with information on the functions of the game service platform server 301 from the game service platform server 301 and may dominantly perform corresponding functions.

For example, if the user selects a ranking inquiry function for a specific group that the user has joined from a game service platform screen after a game service platform application is installed and executed in the client terminal 320, the client application may request a corresponding inquiry of ranking from the game service platform server 301. Then, the game service platform server 301 may inquire group information stored in the group information database 455 through the group ranking calculation unit 433 or the within-group ranking calculation unit 434, calculate a ranking within the corresponding group and a ranking of each group, and transmit the calculated result to the client terminal 320. The client terminal 320 may subsequently confirm the result of the inquiry. Accordingly, a variety of functions may be performed at a server 410, at a client terminal 320, at both the server 410 and the client terminal 320.

Database Server

The database server 306 may include a member information database 451, a game information database 452, a friend information database 453, a record information database 454, and a group information database 455, and may further include other databases needed for providing the game service platform.

The member information database 451 stores a variety of information on members who have joined as a service member or a game member through the game service platform. For example, the member information may include personal identification information of a corresponding member, a picture needed for profile information, a nickname, an avatar, recently played games, installed games, information on a result or a record of each game, ranking information, information on challenging tasks, information on joined SNSs, information on settings of personal information exposure, and information on settings of automatic login.

The game information database 452 stores information on a plurality of games associated with the game service platform server 301. For example, the game information may include information on software installed for each game, information on firm-up software, information on a version of each game, information on a record of each game, information on a challenging task of each game, information on a channel connecting to the game service platform server 301, and information on a member who has joined a corresponding game.

The friend information database 453 stores a variety of information related to SNS game friends registered by a user as a friend or automatically registered in association with a SNS server. For example, the friend information may include information on an ID and a nickname of a registered friend, information on a registration channel, and information on blocked friends.

The record information database 454 may store a variety of records according to a result of a game played by each member. For example, the records information may include a number of rounds played in each game, a score of a member in each game, and a score of a challenging task.

The group information database 455 may include information on a group created through the group creation unit 431 (e.g., tag information of a group, information on a group creator, and information on qualifications for joining a group) and information on a group member who joined through the group join processing unit 432.

Overall Service Procedure

Figure 5:
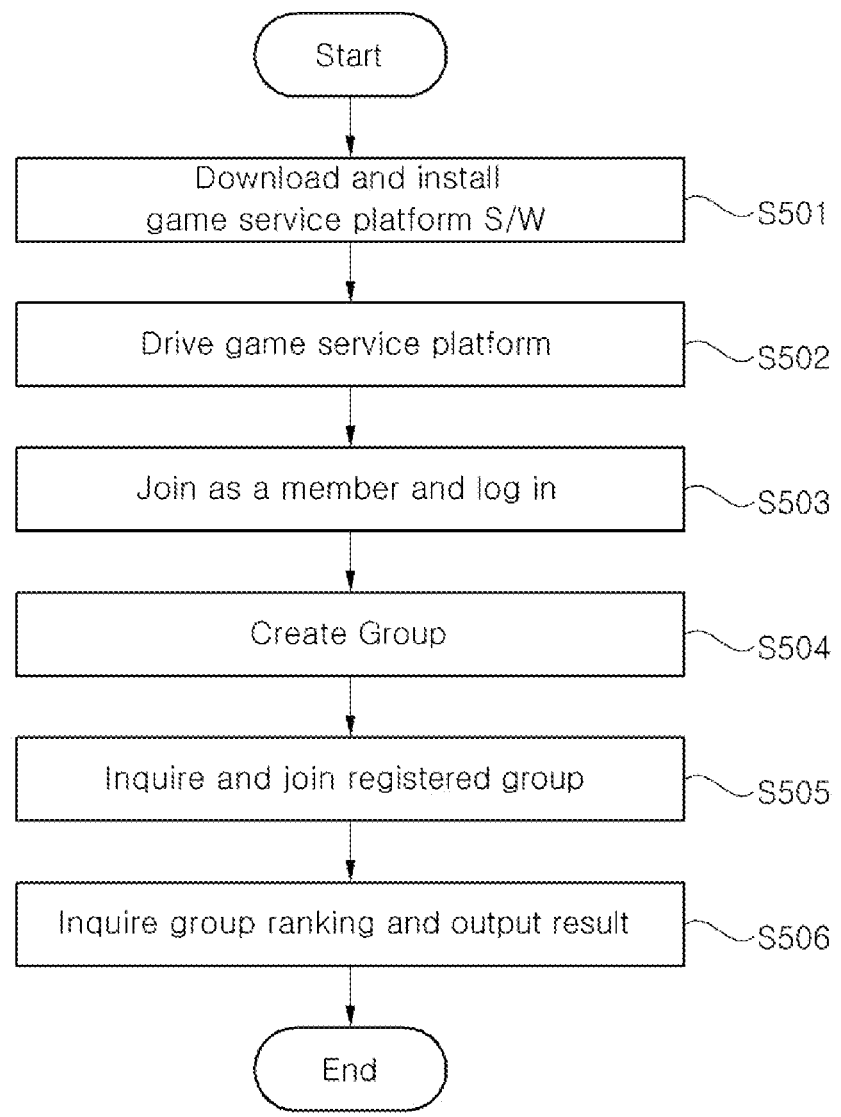
FIG. 5 is a flowchart illustrating a method of providing a game according to exemplary embodiments of the present invention.

FIG. 5 is a flowchart illustrating a method of providing a game according to exemplary embodiments of the present invention. First, a client terminal 320 (e.g., a smart phone) may download and install a game service platform software S/W (S501), and drive the installed game service platform (S502). Then, the user may join the game service platform as a member and log into the game service platform (S503).

The user may then create a group using several methods (S504). For example, the user may create a group of friends by adding friends, may create a group of SNS friends registered via user account authentication of an SNS service that the user has joined, and/or may create a new group by registering a tag. In some cases, if the user would not like to create a new group, the user may inquire about a previously-registered group using a tag and join the group (S505). In some cases, in addition to creating a new group, the user may inquire about a previously-registered group using a tag and join the group (S505)

It should be understood that the user may create or join one or more groups in S504 and S505. The user may create a group by adding friends, create a SNS friend group, and/or create a new group by registering a tag in any order or in parallel. To create a friend group by adding friends, a new group can be created using a method of selecting or adding some or all of the friends registered by the user. To create a SNS friend group, a new group can be created using a method of selecting or adding some or all of the game service members registered as a friend in a SNS service that the user has joined. To create a new group by registering a tag, a new group can be created using a method of inputting a tag mapped to a new group created by the user. If one or more groups are created, rankings of a corresponding group can be inquired through the game service platform, and a ranking within the group and ranking information of each group may be outputted through the game service platform as a result of the inquiry (S506).

Hereinafter, methods of creating and joining a group and inquiring about rankings of the group according to exemplary embodiments of the present invention will be described with reference to FIGS. 6, 7, and 8.

Procedure of Creating a Group

A group which provides ranking information may be created using a variety of methods. A group of friends may be registered according to a variety of methods (e.g., friends registered in an address book, friends registered in a SNS). A group may be created including the registered friends, or a small group can be separately created by selecting some of the friends from the registered group of friends.

As shown in FIG. 6, a user may create a new group by registering a tag, and all the game service members can be registered as a member of the group. FIG. 6 is a flowchart illustrating a method of creating a group according to exemplary embodiments of the present invention. If a group creation menu is selected through the game service platform (S601), a new group is created by inputting a group name or a tag (S602). If the group name or the tag is a word already registered (S603), another group name or tag is inputted. This step may be repeated until a name that is not registered is input.

When an inputted group name is not registered, qualifications (e.g., an age, a region, a game ranking) for joining the group may be input (S604). Accordingly, creation of the group is completed (S605).

Although exemplary embodiments described above describe that a group may be created by inputting a group name or a tag, in some cases, one or more tags may additionally be set after the group name is set. For example, after three tags are set to one group name, a user may search for a corresponding group by inputting the registered group name or tag. When a group is searched using a tag, a plurality of groups including the same tag can be obtained as a result of the search. For example, if a person living in Orange County searches for a group by searching for 'Orange County' as a tag, a plurality of groups (e.g., 'Orange County working mom', 'Orange County NHN') including 'Orange County' as a tag can be searched.

Procedure of Joining a Group

FIG. 7 is a flowchart illustrating a method of joining a group according to exemplary embodiments of the present invention. As shown in FIG. 7, registered groups may be searched for by entering a group name through the game service platform (S701). According to a search result of the entered group name, a list of searched groups may be displayed (S702). The game service platform may determine if the user has selected a specific group to join from the list (S703). If a group is not selected, the method for joining a searched group may end.

If a group is selected, a group join request signal may be transmitted to the group join processing unit 432 of the group ranking management unit 430 included in the game service platform server 301 of the service server 300, and the group join processing unit 432 may determine whether or not the user requesting to join the group meets the qualifications for joining the group based on the group information database 455 (S704). If the user meets the qualifications as a result of the determination (S705), the process of joining the group for the user may, in some cases, be complete (S707).

In some cases, the user may be approved immediately to join the group if the user meets the qualifications as described above, but, in some cases, the service server 300 or the creator of the group may need to approve the user's request to join the group (S706).

Procedure of Inquiring about a Group Ranking

Figure 10:
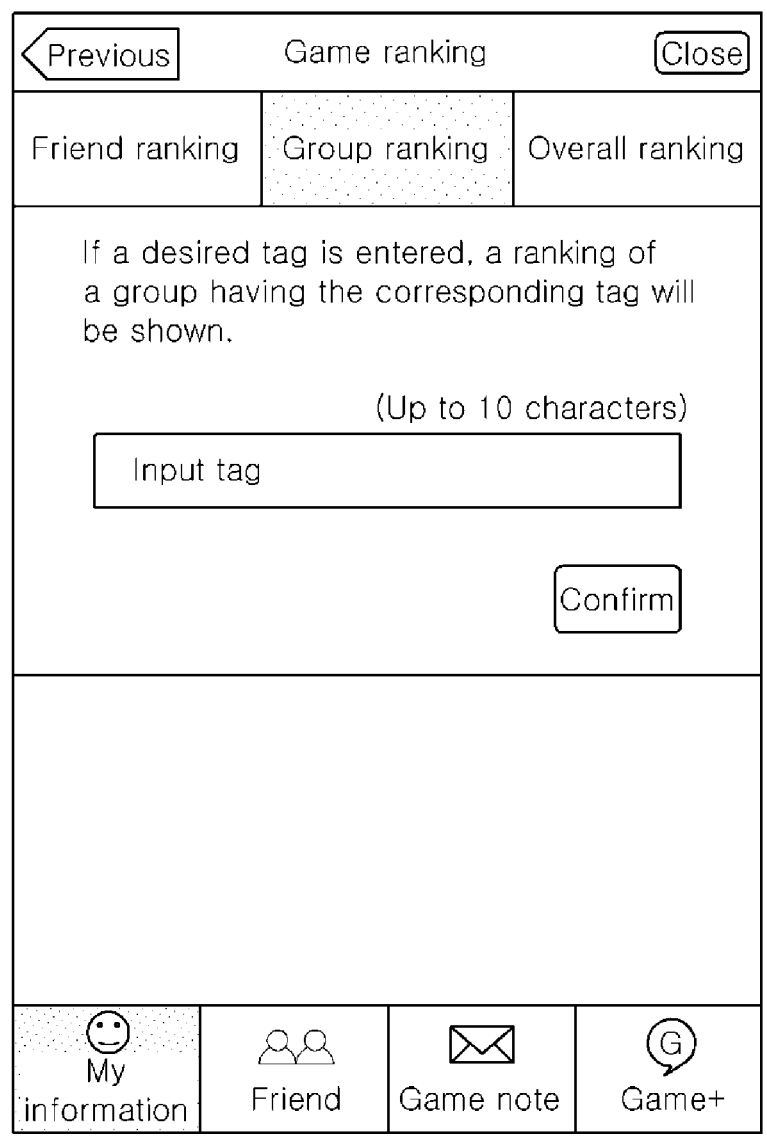
FIG. 10 is a view showing a screen of a smart phone, displaying a group ranking inquiry according to exemplary embodiments of the present invention.

FIG. 8 is a flowchart illustrating a procedure of inquiring about a group ranking according to exemplary embodiments of the present invention. As shown in FIG. 8, if the user selects a group ranking inquiry through the game service platform (S801), a tag input window for the group ranking inquiry is provided, as shown in FIG. 10. A joined group may be searched for or inquired about, or a new group may be created with other members as described in FIG. 5. For example, a group may be inquired about by inputting a tag name into the tag input window (S802). If ranking inquiry for a group corresponding to the input tag name is requested from the service server 300 (S803), the group ranking management module 430 of the service server 300 may confirm a list of members of the group through the group information database 455, determine whether a plurality of game services associated with the game service platform is installed in terminals of the members of the joined or created game group, and read scores of each member from the record information database 454. The client terminal 320 may receive, from the service server 300, information regarding the results of the determination of whether the plurality of game services associated with the game service platform is installed in terminals of the members of the group. A list of the plurality of game services installed in terminals of other members of the group may be displayed in the client terminal 320, and the user may select at least one of the game services that may be of interest to the user.

Then, a group score may be calculated based on a predetermined method (e.g., addition of individual game scores or activity scores of each member, or an average score of each member) (S805). Accordingly, a ranking of the user within the group may be calculated (S806), and a ranking among the groups may be calculated by comparing the calculated group score with scores of other groups (S807). For example, in some cases, if the user selects one of the game services displayed on the client terminal 320, ranking information of the user with respect to other members having installed the game service selected by the user may be calculated.

The calculated ranking result may be displayed through the game service platform of the client terminal 320 (e.g., smart phone) of the user who has requested the group ranking inquiry (S808).

FIG. 9 is a view showing an information storage table 900 for providing a group ranking for each user according to exemplary embodiments of the present invention. Referring to FIG. 9, in order to provide a ranking of each group and a ranking among the groups according to exemplary embodiments of the present invention, it is preferable to collect and store a variety of information related to the group for each user.

For example, as shown in FIG. 9, information such as a user ID 910, a nickname 920, groups (tags) created by the user 930, joined groups (tags) 940, registered friends 950, joined SNSs 960, and user's scores 970 can be stored and managed in each database.

Example of Implementing a Service

FIG. 10 is a view showing a screen of a smart phone 320. The screen displays a group ranking inquiry according to exemplary embodiments of the present invention. Referring to FIG. 10, if the group ranking of the game ranking menu is selected on the game service platform driven at the user's smart phone, a tag input window is provided for inputting a group name or a tag. If a group name or a tag is inputted as a keyword through the tag input window, a ranking of a group which sets the inputted keyword as a group name or a tag can be inquired about.

Figure 11:
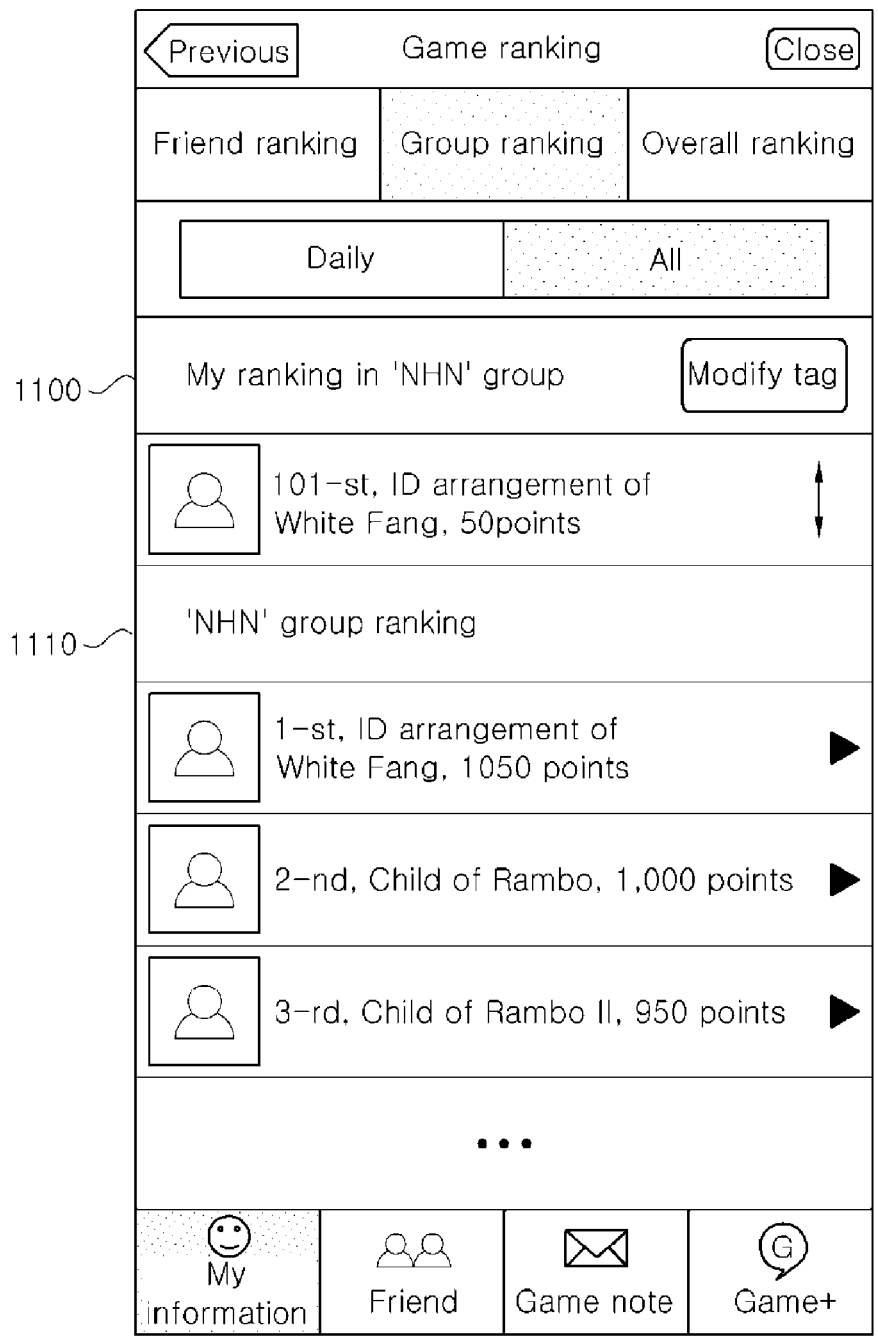
FIG. 11 is a view showing a screen of a smart phone, displaying a result of a group ranking inquiry according to exemplary embodiments of the present invention.

FIG. 11 is a view showing a screen of a smart phone 320 displaying a result of a group ranking inquiry according to exemplary embodiments of the present invention. Referring to FIG. 11, a daily or overall ranking of a group are provided as a result of the group ranking inquiry of FIG. 10, and ranking information of the user in the group can be confirmed. For example, as shown in the FIG. 11, if the joined group is 'NHN', the user's ranking information 1100 in the 'NHN' group and a ranking of the 'NHN' group 1110 compared with those of the other groups can be provided.

Figure 12:
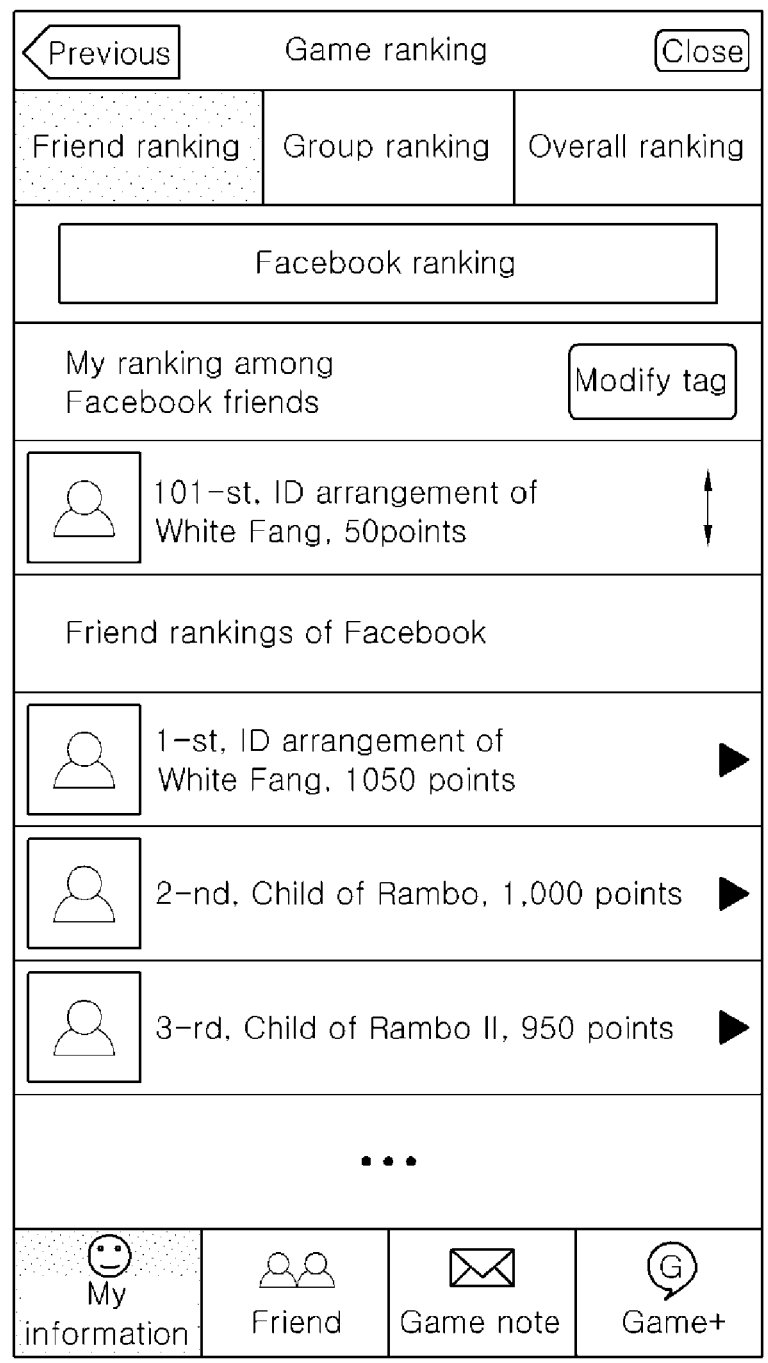
FIG. 12 is a view showing a screen of a smart phone, displaying a result of an SNS friend ranking inquiry according to exemplary embodiments of the present invention.

FIG. 12 is a view showing a screen of a smart phone 320 displaying a result of a SNS friend ranking inquiry according to exemplary embodiments of the present invention. Referring to FIG. 12, ranking information within a group created by some or all of the users who have joined a SNS (of which the user is already a member) as a friend may be determined. Ranking information within a group created by the user may also be obtained. As shown in FIG. 12, if a corresponding user has joined a SNS service such as Facebook®, the user may confirm his or her ranking among the user's friends registered in the Facebook® service.

Accordingly, a sense of belonging and solidarity of a community can be strengthened by confirming rankings within a group related to the user and rankings among the groups, and not by providing conventional meaningless overall ranking information.

Exemplary embodiments of the present invention can be implemented in a program command form that can be executed through a variety of computer means (e.g., processor) and recorded in a computer-readable medium. The computer-readable medium may include program commands, data files, and data structures in a single or combined form. The program commands recorded in the medium may be program commands specially designed and configured to execute exemplary embodiments of the present invention or program commands that are publicized and available for those skilled in the art of computer software. Examples of the computer-readable medium include magnetic media such as a hard disk, a floppy disk and a magnetic tape, optical media such as a CD-ROM and a DVD, magneto-optical media such as a floptical disk, and hardware devices specially configured to store and execute the program commands, such as ROM, RAM, and flash memory. Examples of the program commands include high-level language codes that can be executed by a computer using an interpreter, as well as machine codes such as those generated by a compiler. The hardware devices may be configured to operate as one or more software modules in order to perform operations of the present invention, and vice versa.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

What is claimed is:

1. A method for providing a game ranking in a game service platform system, the game service platform system comprising a game service platform server providing a game service platform, a first user device of a first user registered in the game service platform, a second user device of a second user registered as a social network service (SNS) acquaintance of the first user and a game server providing a plurality of games for a user device in association with the game service platform server, the method being performed by the game service platform server, comprising:
 receiving a service request over a communication network to access a game from the first user device connected to the game service platform server, wherein the service request comprises identification information of the first user comprising account information of a SNS subscribed by the first user;
 receiving, from an SNS server, a list of SNS acquaintances of the first user comprising the second user;
 storing a list of SNS acquaintances of the first user comprising the second user in a friend information database;
 determining, by a friend registration management unit, in response to the service request whether the first user is a subscriber of the game service platform using the identification information; and
 determining whether the second user has joined the game in response to the first user being determined as a subscriber of the game service platform;
 registering, automatically, the second user as a game friend of the first user in response to the second user being determined to have joined the game;
 calculating ranking information of the second user listed in the list of SNS acquaintances of the first user in response to the second user joining the game; and
 transmitting the ranking information to the first user device for display when executing the game on the first user device in response to the service request.

2. The method of claim 1 further comprising,
 allocating at least one user included in the SNS acquaintance list to at least one group, wherein the at least one user has installed the game.

3. The method of claim 2,
 wherein the group is designated, on the game, to each social network service where the first user is registered.

4. The method of claim 2,
 wherein the at least one user is allocated to the group by selection of the first user.

5. A game service platform server servicing a plurality of games in association with a plurality of game servers, comprising:
 a first server configured to store a list of social network service (SNS) acquaintances of a first user comprising a second user, the list of SNS acquaintances received from an SNS server; and
 a second server configured to determine, in response to a request to execute a game from a first user device of the first user, whether the second user has joined the game, transmit to the first user device a result as to whether the second user has joined the game, register, automatically, the second user as a game friend of the first user in response to the second user being determined to have joined the game, and calculate ranking information of the second user listed in the list of SNS acquaintances,
 wherein the ranking information is transmitted for display on the first user device when executing the game on the first user device in response to the request.

6. The game service platform server of claim 5, wherein the first server has game service platform identification information of first the user,
wherein the service platform identification information is user identification information for at least one social network service where the first user has been registered.

7. The game service platform server of claim 5, wherein the second server comprises a group generating part configured to allocate at least one user included in the SNS acquaintance information to at least one group, wherein the at least one user has the game installed.

8. The game service platform server of claim 7, wherein the group generating part generates, on the game, at least one group for each social network service where the first user is registered.

9. The game service platform server of claim 7, wherein the group generating part allocates at least one other user to the group by selection of the first user.

10. A method performed by a game service platform server of a game service platform system to provide a ranking for a game group, the game service platform system comprising a game service platform server providing a game service platform, a first user device of a first user registered on the game service platform and a game server providing a user device with a game in association with the game service platform server, the method comprising:
receiving, from a first user device, a request for service of a game from among a plurality of games provided by the game service platform server;
allowing, in response to the request for service of the game, the first user device to execute the game, wherein the request for service is submitted using an account associated with a social network service (SNS) subscribed by the first user;
inquiring, in response to the request for service of the game, a list of SNS acquaintance information to determine whether the game is installed on a second user device of a second user, wherein the second user is registered as a SNS acquaintance of the first user for the SNS;
registering, automatically, the second user as a game friend of the first user in response to the second user having installed the game; and
generating a game group list comprising at least a game friend of the first user for the game,
wherein the second user is in the game group in response to the game being installed on the second user device.

11. The method of claim 10 further comprising transmitting an invitation message to the second user device in response to the game not being installed on the second user device.

12. The method of claim 11, wherein the invitation message comprises a direct link to a page for installation of the game.

13. The method of claim 10, wherein the first user device receives a score of the each game friend from the game server for the game.

14. A method for providing a user device with game service, the method performed by a game service platform server providing a plurality of games, comprising:
receiving, from the user device of a user, a request to access the game service platform server using an account associated to a social network service(SNS) subscribed by the user;
determining whether the user of the user device is a subscriber of the game service platform;
authorizing execution of a game service platform software installed on the user device and transmitting, to the user device, a game list including at least one game provided by the game service platform in response to the user being determined as a subscriber of the game service platform;
inquiring, in response to a request for service of a game in the game list, of SNS acquaintance information of the user, wherein the SNS acquaintance information comprises information on whether each SNS acquaintance of the user for the SNS has joined the requested game;
registering, automatically, each SNS acquaintance as a game friend of the user in response to the SNS acquaintance having joined the requested game; and
transmitting, to the user device, game group information comprising a first group of the SNS acquaintances, wherein each of the first group of the SNS acquaintances has joined the requested game.

15. The method of claim 14, further comprising transmitting an invitation message to a SNS acquaintance of a second group of the SNS acquaintances by an invitation request from the user device, wherein each of the second group of the SNS acquaintances has not joined the requested game.

16. The method of claim 15, wherein the invitation message comprises a direct link to a page for installation of the requested game.

17. The method of claim 14, wherein the user device receives a score of the each game friend from a game server for the requested game.

18. A non-transitory computer-readable storage medium comprising an executable program which, when executed by a computer, performs a method for providing a ranking of a game group, the method comprising:
displaying a game service platform interface providing at least one game;
executing a game software in response to a user selecting a game via the game service platform interface using an account associated with a social network service (SNS) subscribed by the user;
requesting a SNS acquaintance list to display a game ranking for the selected game, wherein the SNS acquaintance list comprises SNS acquaintances of the user for the SNS, wherein the acquaintance list comprises information on whether the selected game has been installed on user devices of the SNS acquaintances;
registering, automatically, each SNS acquaintance as a game friend of the user in response to the SNS acquaintance having installed the selected game; and
displaying a game friend list for the selected game based on the list of SNS acquaintances, wherein the game friend list comprises a first group of SNS acquaintances whose user devices have the selected game installed.

19. The non-transitory computer-readable storage medium of claim 18, further comprising a computer-executable instruction of transmitting an invitation message through the game service platform server to an SNS acquaintance in response to user device of the SNS acquaintance not having installed the selected game.

20. The non-transitory computer-readable storage medium of claim 19, wherein the invitation message comprises a direct link to a page for installation of the selected game.

21. The non-transitory computer-readable storage medium of claim 18, wherein the user device receives a score of the each game friend from a game server for the selected game.

22. A non-transitory computer-readable storage medium comprising a computer executable program which, when executed by a user device, performs a method for providing a ranking of a game group, the method comprising:

accessing a game server providing a game selected using an account associated with a social network service (SNS) subscribed by a user of the user device, wherein the selected game is one of a plurality games provided by a game service platform interface;

requesting an SNS acquaintance list to display a game ranking for the selected game, wherein the SNS acquaintance list comprises SNS acquaintances of the user for the SNS, wherein the acquaintance list comprises information on whether the selected game has been installed on user devices of the SNS acquaintances;

registering, automatically, the SNS acquaintance as a game friend of the user in response to the SNS acquaintance having installed the selected game; and displaying a game friend list for the selected game based on the SNS acquaintance list, wherein the game friend list comprises a first group of SNS acquaintances whose user devices have the selected game installed, wherein the ranking is displayed for the first group of SNS acquaintances.

23. A non-transitory computer-readable storage medium comprising an executable program which, when executed by a computer, performs a method of providing a ranking of a game group, the method comprising:

displaying a game service platform interface providing at least one game on a user device;

executing a game software in response to a user of the user device selecting the game via the game service platform interface using an account associated with a social network service (SNS) subscribed by the user;

requesting an SNS acquaintance list to display a game ranking for the selected game, wherein the SNS acquaintance list comprises SNS acquaintances of the user for the SNS, wherein the SNS acquaintance list comprises information on whether the SNS acquaintances have joined the selected game;

registering, automatically, each SNS acquaintance as a game friend of the user in response to the SNS acquaintance having joined the selected game; and displaying a game friend list for the selected game based on the SNS acquaintance list, wherein the game friend list comprises a first group of SNS acquaintances who have joined the selected game.

24. The non-transitory computer-readable storage medium of claim 23, further comprising a computer-executable instruction of transmitting an invitation message through the game service platform server to an SNS acquaintance in response to a user device of the SNS acquaintance not having installed the selected game.

25. The non-transitory computer-readable storage medium of claim 24, wherein the invitation message comprises a direct link to a page for installation of the selected game.

26. The non-transitory computer-readable storage medium of claim 23, wherein the user device receives a score of the each game friend from a game server for the selected game.

27. A non-transitory computer-readable storage medium comprising a computer executable program which, when executed by a user device, performs a method of providing a ranking of a game group, the method comprising:

accessing a game server providing a game selected using an account associated with a social network service (SNS) subscribed by a user of the user device, wherein the game is one of a plurality games provided by a game service platform interface;

requesting an SNS acquaintance list to display a game ranking for the selected game, wherein the SNS acquaintance list comprises SNS acquaintances of the user for the SNS, wherein the SNS acquaintance list comprises information on whether the SNS acquaintances have joined the selected game;

registering, automatically, the SNS acquaintance as a game friend of the user in response to the SNS acquaintance having joined the selected game; and displaying a game friend list for the selected game based on the SNS acquaintance list, wherein the game friend list comprises a first group of SNS acquaintances who have joined the selected game.

* * * * *